(12) United States Patent
Hu et al.

(10) Patent No.: US 8,393,232 B2
(45) Date of Patent: Mar. 12, 2013

(54) TORQUE DETECTOR

(75) Inventors: Tsung-Hsien Hu, Changhua County (TW); Chau-Chih Yu, Changhua County (TW); Chih-Jung Yeh, Changhua County (TW)

(73) Assignee: Automotive Research & Testing Center, Lugong, Changhua County (TW)

( * ) Notice: Subject to any disclaimer, the term of this patent is extended or adjusted under 35 U.S.C. 154(b) by 289 days.

(21) Appl. No.: 12/974,927

(22) Filed: Dec. 21, 2010

(65) Prior Publication Data
US 2012/0137790 A1   Jun. 7, 2012

(51) Int. Cl.
*G01L 1/22* (2006.01)
(52) U.S. Cl. .................. 73/862.338; 73/862.08
(58) Field of Classification Search .......... 73/862.08, 73/862.193, 862.338
See application file for complete search history.

(56) References Cited

U.S. PATENT DOCUMENTS

| 4,077,266 | A | * | 3/1978 | Takamatsu et al. | 73/514.04 |
| 5,027,663 | A | * | 7/1991 | Frister et al. | 73/862.331 |
| 6,223,607 | B1 | * | 5/2001 | Yasui | 73/862.333 |
| 6,427,542 | B1 | * | 8/2002 | Nicot | 73/862.326 |
| 6,694,828 | B1 | * | 2/2004 | Nicot | 73/862.326 |

* cited by examiner

*Primary Examiner* — Max Noori
(74) *Attorney, Agent, or Firm* — Christie, Parker & Hale, LLP

(57) ABSTRACT

A torque detector includes an output body, an input body adapted to permit a torque to be applied thereto, a torque beam unit, and a detecting unit disposed between the input and output bodies for converting a relative rotation of the input and output bodies into an electric signal. The torque beam unit includes a shaft, at least one flexible first beam extending radially and outwardly from the shaft and having a proximate end portion connected to the shaft, and a distal end portion connected to and co-rotatable with the output body, and at least one second flexible beam extending radially and outwardly from the shaft in a direction different from that of the first beam and having a proximate end portion connected to the shaft, and a distal end portion connected to and co-rotatable with the input body.

9 Claims, 9 Drawing Sheets

TORQUE DETECTOR

BACKGROUND OF THE INVENTION

1. Field of the Invention

This invention relates to a torque detector, and more particularly to a torque detector including a torque beam unit that is at least partially flexible to allow for relative rotation between an input body and an output body.

2. Description of the Related Art

Referring to FIG. 1, a conventional torque detector disclosed in U.S. Pat. No. 6,370,966 includes a pair of input and output shafts 11, 12 that extend along an axis 10, a sleeve 13 that has an internally splined portion engaging an externally splined portion of the input shaft 11 and that is movable relative to the output shaft 12 along the axis 10, and a sensor 14 connected to the sleeve 13 for detecting the displacement amount of the sleeve 13.

When a torque is applied to rotate the input shaft 11 relative to the output shaft 12, the angular displacement of the input shaft 11 is converted into movement of the sleeve 13 along the axis 10, which can be detected by the sensor 14.

However, since the angular displacement of the input shaft 11 is converted into the movement of the sleeve 13 through a spline arrangement including the internally splined portion and the externally splined portion, the entire structure of the conventional torque detector gets complicated, thereby resulting in increased manufacturing costs.

SUMMARY OF THE INVENTION

The object of this invention is to provide a torque detector that has a simple structure and that is inexpensive to manufacture.

Accordingly, a torque detector of this invention includes an output body, an input body adapted to permit a torque to be applied thereto, a torque beam unit, and a detecting unit disposed between the input and output bodies for converting a relative rotation of the input and output bodies into an electric signal. The torque beam unit includes a shaft, at least one flexible first beam extending radially and outwardly from the shaft and having a proximate end portion connected to the shaft, and a distal end portion connected to and co-rotatable with the output body, and at least one second flexible beam extending radially and outwardly from the shaft in a direction different from that of the first beam and having a proximate end portion connected to the shaft, and a distal end portion connected to and co-rotatable with the input body.

As such, when the input body is rotated relative to the output body as a result of the application of the torque to the input body, the torque beam unit deforms, and the detecting unit outputs the electric signal. The torque beam unit is simple in structure, and is made at a low cost.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
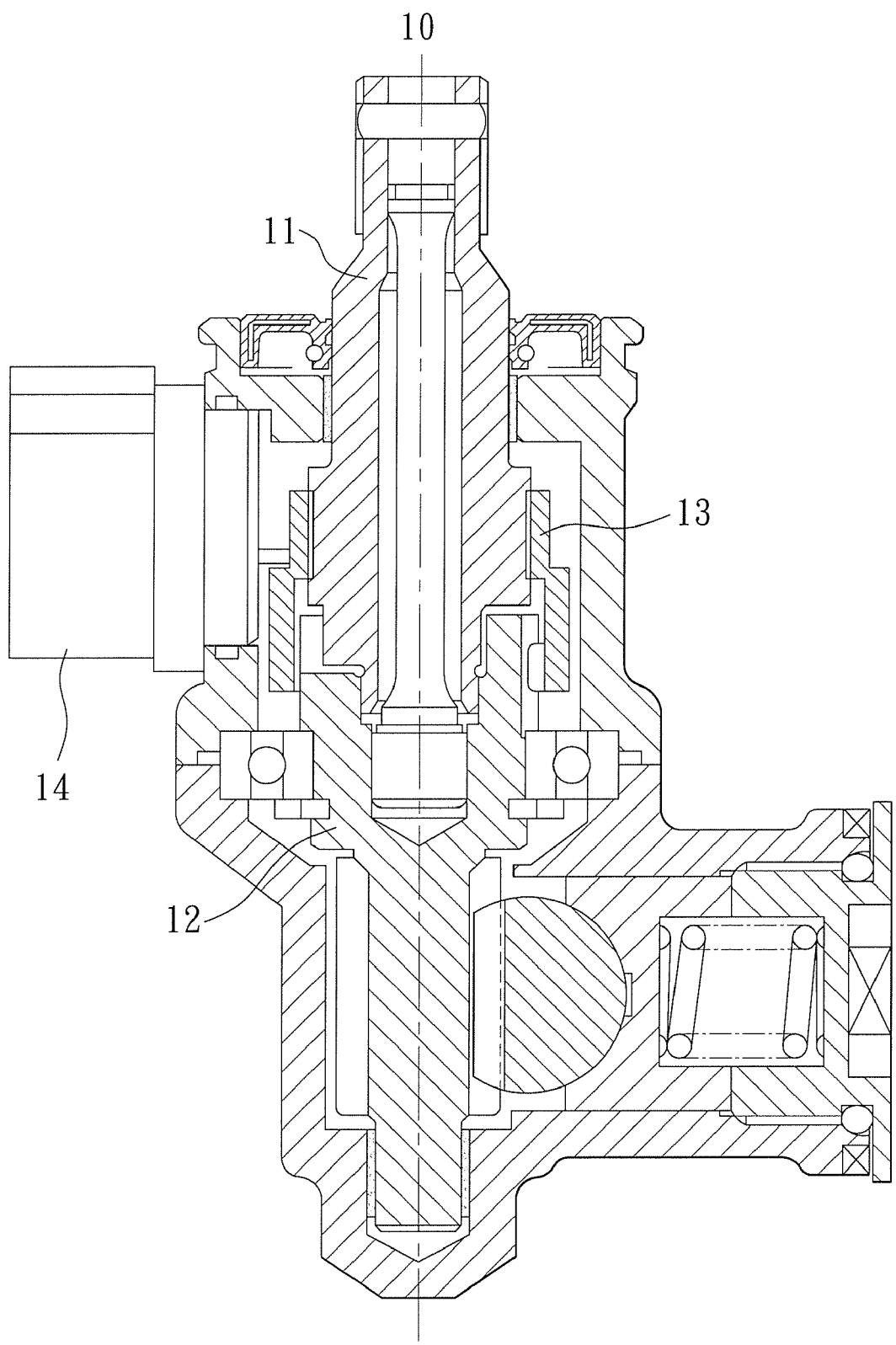
FIG. 1 is a sectional view of a conventional torque detector disclosed in U.S. Pat. No. 6,370,966.

Before the present invention is described in greater detail in connection with the preferred embodiments, it should be noted that similar elements and structures are designated by like reference numerals throughout the entire disclosure.

Figure 2:
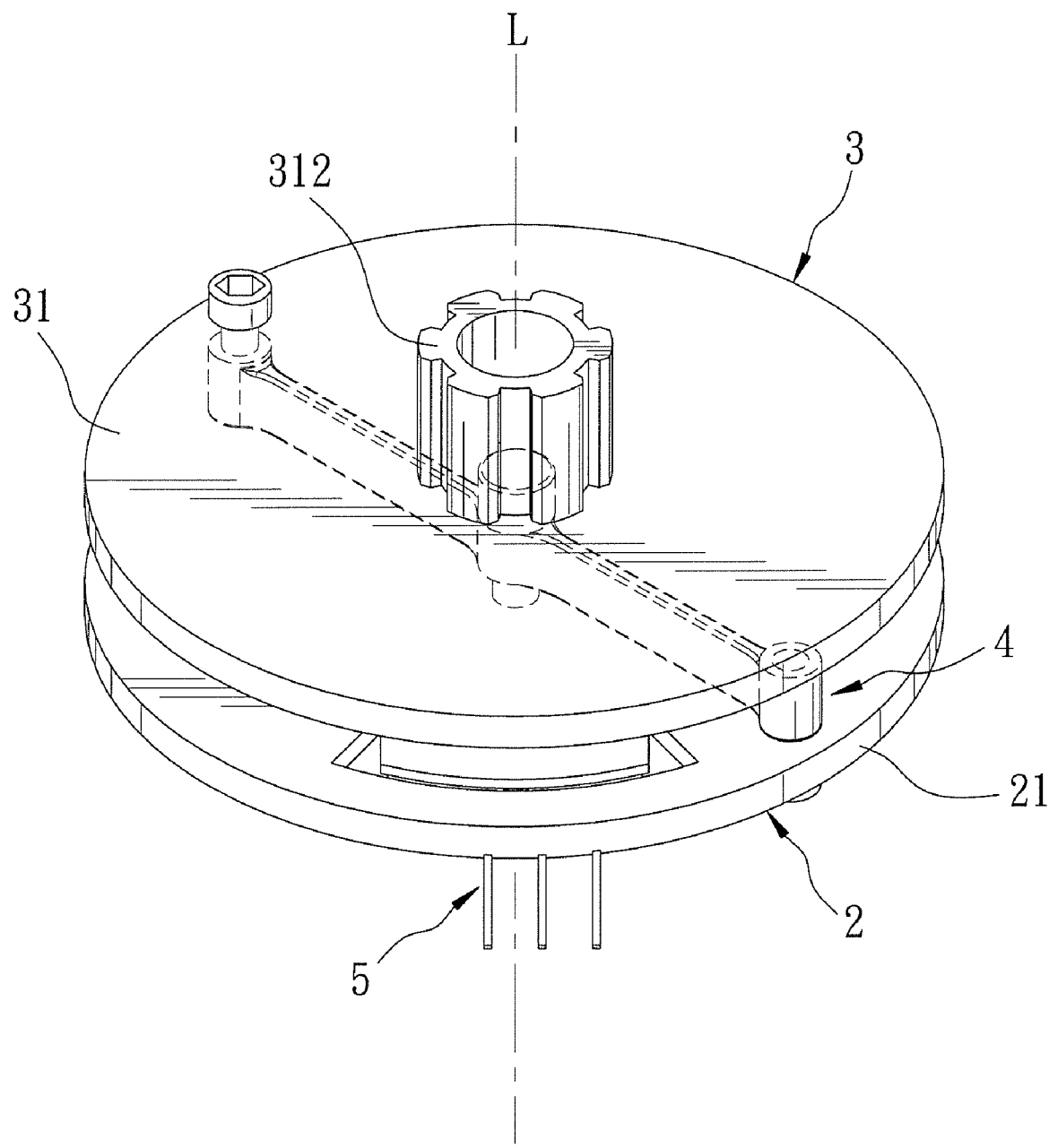
FIG. 2 is an assembled perspective view of the first preferred embodiment of a torque detector according to this invention.
Figure 3:
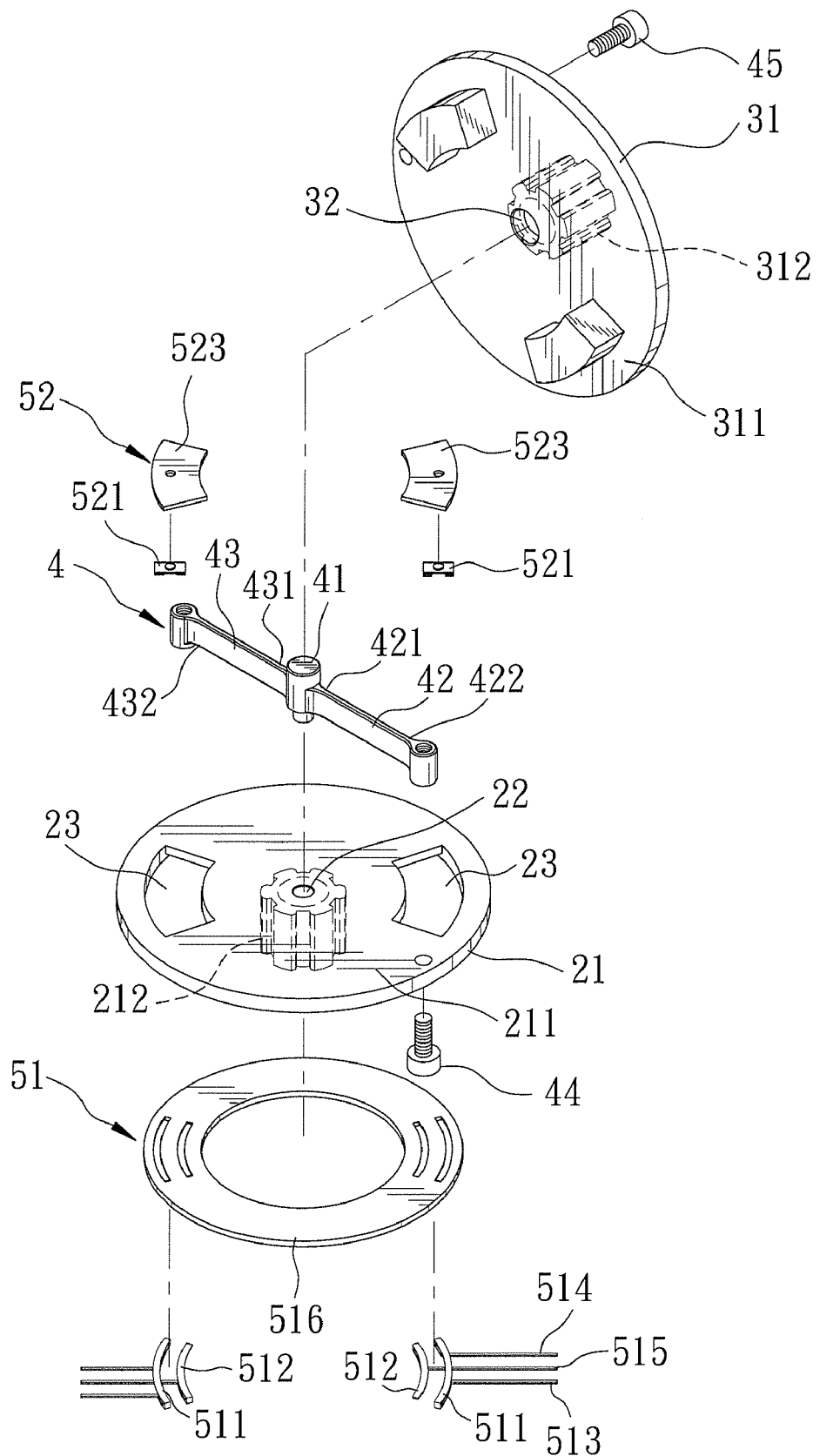
FIG. 3 is an exploded perspective view of the first preferred embodiment.

Referring to FIGS. 2 and 3, the first preferred embodiment of a torque detector according to this invention includes an output unit 2, an input unit 3, a torque beam unit 4, and a detecting unit 5.

The output unit 2 includes an output body 21, an output hole 22 formed in a central portion of the output body 21, and two through grooves 23 located respectively to two opposite sides of the output hole 22. The output body 21 has a disk portion 211, and an output portion 212 extending downwardly from a central portion of the disk portion 211. In this embodiment, the output portion 212 is configured as a spline shaft, and has a non-circular cross-section.

The input unit 3 includes an input body 31 disposed above and rotatable relative to the output body 21 and permitting a torque to be applied thereto, and an input hole 32 formed in the input body 31 and aligned with the output hole 22. The input body 31 has a disk portion 311 parallel to the output body 21, and a force application portion 312 extending from the disk portion 311 away from the output unit 2. In this embodiment, the force application portion 312 is configured as a spline shaft, and has a non-circular cross-section.

The torque beam unit 4 includes a shaft 41, a first beam 42, a second beam 43, a first bolt 44, and a second bolt 45. The shaft 41 has two opposite ends extending respectively into the output hole 22 and the input hole 32 along an axis (L). The first beam 42 extends radially and outwardly from the shaft 21, and has a proximate end portion 421 connected to the shaft 21, and a distal end portion 422 connected to and co-rotatable with the output body 21. The second beam 43 extends radially and outwardly from the shaft 41 away from the first beam 42, and has a proximate end portion 431 connected to the shaft 41, and a distal end portion 432 connected to and co-rotatable with the input body 31. In this embodiment, the first and second beams 42, 43 are aligned with each other. The first bolt 44 extends through the output body 21, and is threaded to the distal end portion 422 of the first beam 42, so as to interconnect the first beam 42 and the output body 21. The second bolt 45 extends through the input body 31, and is threaded to the distal end portion 432 of the second beam 43, so as to interconnect the second beam 43 and the input body 31.

Figure 4:
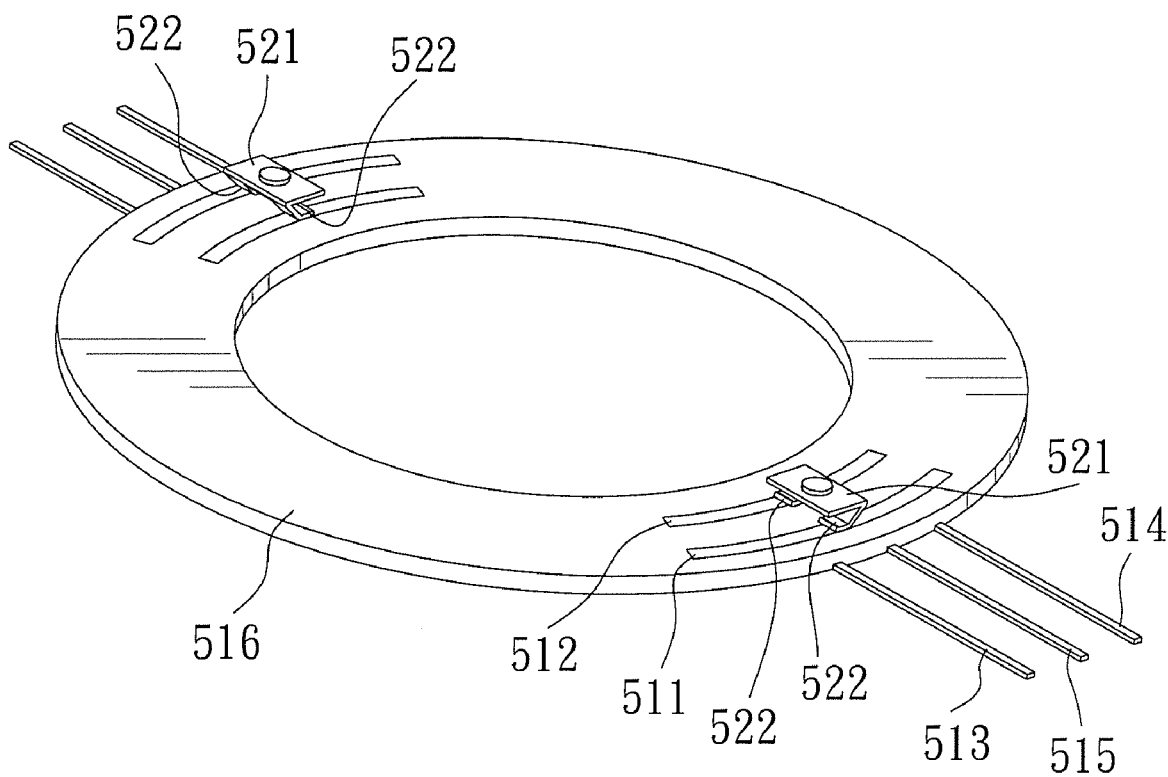
FIG. 4 is a fragmentary perspective view of the first preferred embodiment.

With additional reference to FIG. 4, the detecting unit 5 is disposed between the output unit 2 and the input unit 3 for converting relative rotation of the input and output bodies 31, 21 into an electric signal. In this embodiment, the electric signal is a voltage signal.

The detecting unit 5 includes a first detecting member 51 disposed on the output body 21 and corresponding to the through grooves 23, and a second detecting member 52 disposed on the input body 31 and corresponding to the first detecting member 51 for converting relative rotational displacement of the first and second detecting members 51, 52 into an electric signal.

The second detecting member 52 includes two conductors 521 each having two contact arms 522 in contact with the first detecting member 51. The first detecting member 51 includes two resistor members 511, two conductive members 512 spaced apart from the resistor members 511, and a first mounting member 516. Each of the resistor members 511 is in electrical contact with one of the two contact arms 522 of a respective one of the conductors 521. Each of the conductive members 512 is in electrical contact with the other one of the two contact arms 522 of the respective one of the conductors 521. The resistor members 511 and the conductive members 512 are disposed on the first mounting member 516. The first mounting member 516 is connected to the output body 21. In this embodiment, the first mounting member 516 is adhered to the output body 21. The second detecting member 52 further includes two second mounting members 523 each disposed between the input body 31 and the corresponding conductor 521 for connecting the corresponding conductor 521 fixedly to the input body 31.

Each of the resistor members 511 includes a pair of first and second contact pins 513, 514 interconnected in series. Each of the conductive members 512 includes an output contact pin 515 for outputting the electric signal. In this embodiment, the first and second contact pins 513, 514 of each of the resistor members 511 are connected respectively to a positive voltage source (not shown) and a grounding wire (not shown).

When the torque is applied to the force application portion 312, the input body 31 is rotated relative to the output body 21 to deform the torque beam unit 4. During rotation of the input body 31 relative to the output body 21, the conductors 521 slide on the resistor members 511 and the conductive members 512 to result in a change in the resistance value of each of the resistor members 511. Hence, each of the output contact pins 515 generates an electric signal corresponding to the angular displacement of the input body 31 relative to the output body 21. Consequently, the torque applied to the force application 312 can be detected.

The torque is directly proportional to the angular displacement of the input body 31 and, thus, the change amount of the resistance value of each of the resistor members 511. Due to the flexibility of the first and second beams 42, 43, the torque beam unit 4 is deformable to allow for rotation of the input body 31 relative to the output body 21. The torque beam unit 4 is simpler in structure and less expensive than the spline arrangement required for the above-mentioned conventional torque detector. Thus, the object of this invention is achieved.

Figure 5:
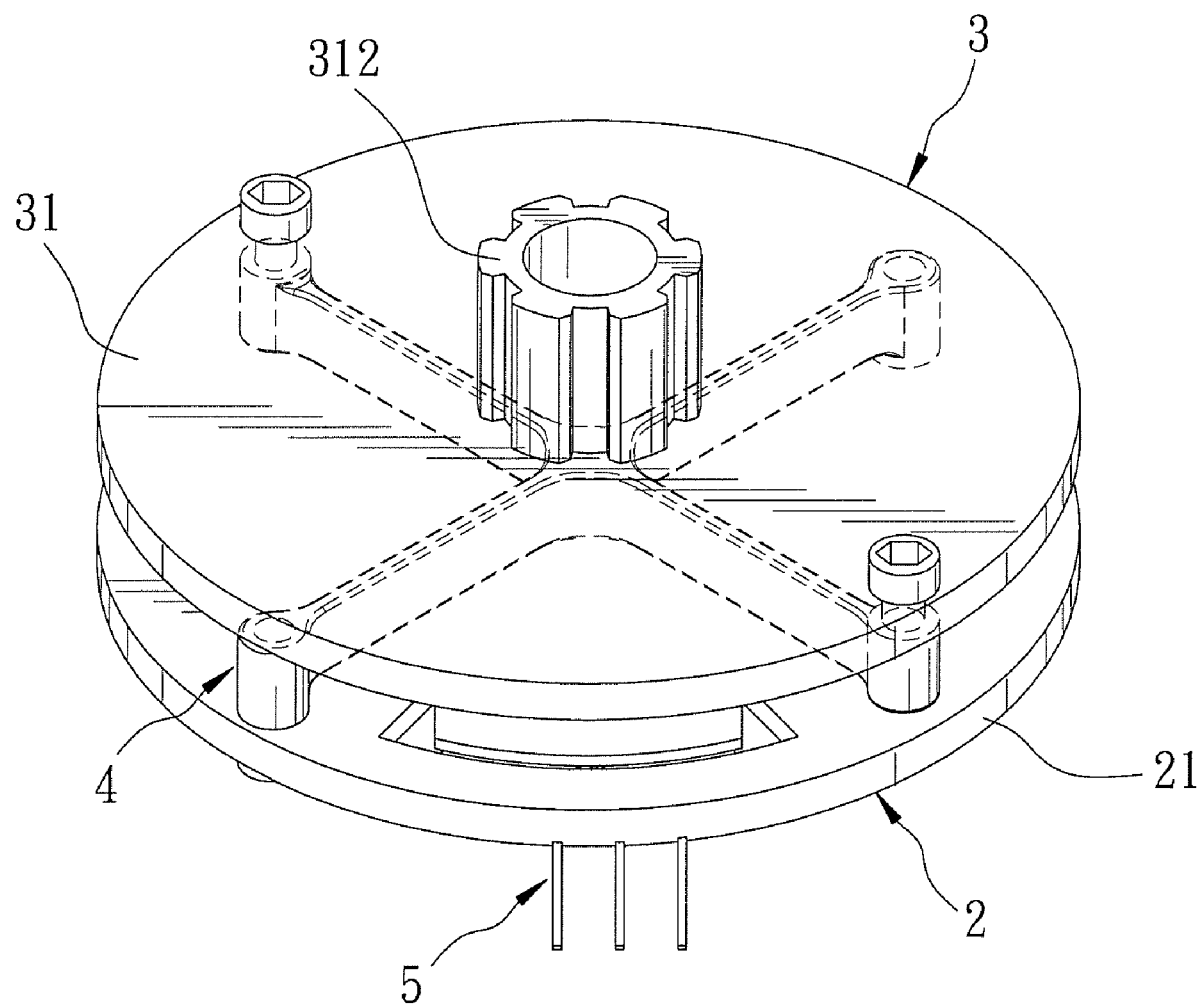
FIG. 5 is an assembled perspective view of the second preferred embodiment of a torque detector according to this invention.
Figure 6:
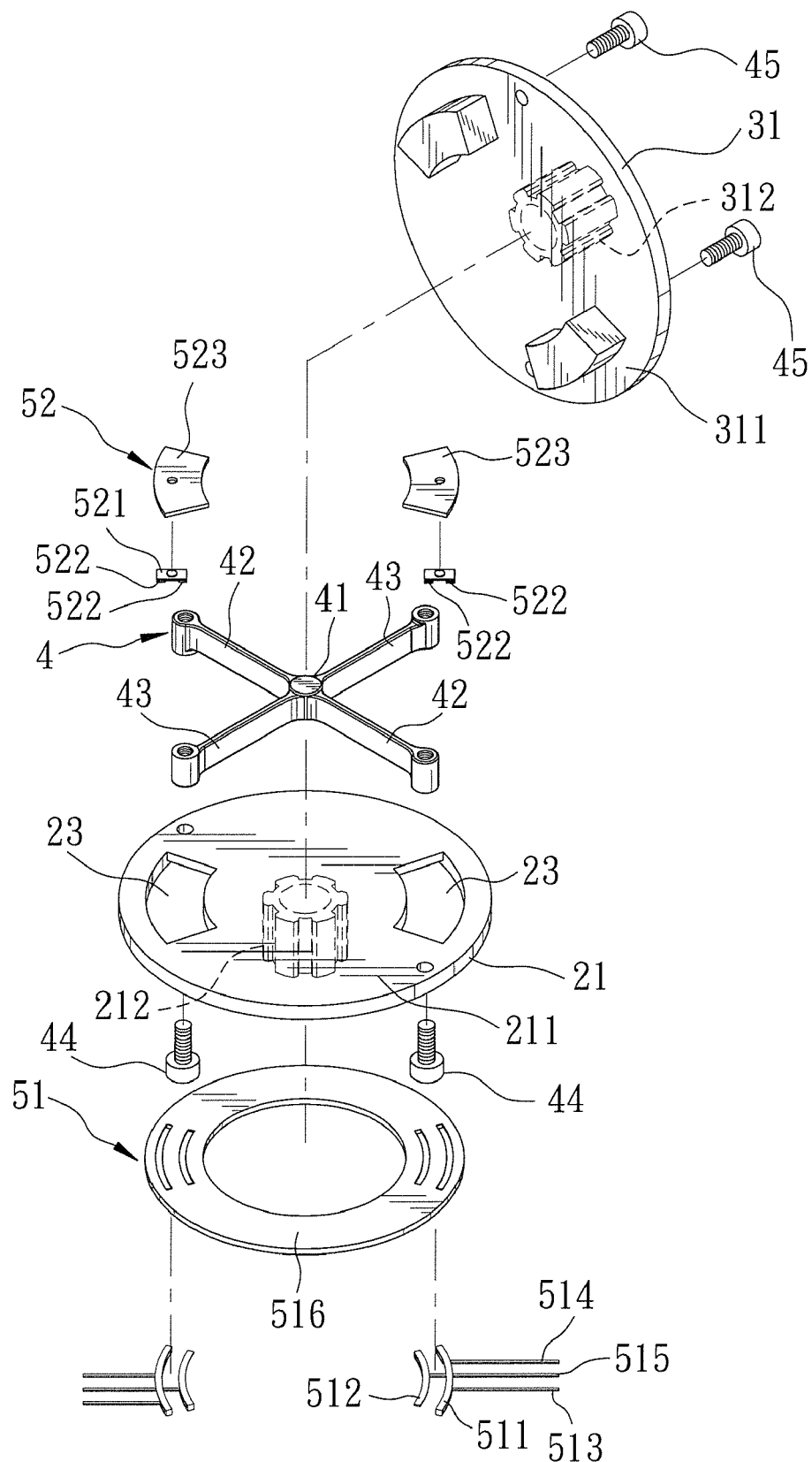
FIG. 6 is an exploded perspective view of the second preferred embodiment.

FIGS. 5 and 6 show the second preferred embodiment of a torque detector according to this invention, which is similar in construction to the first preferred embodiment. In this embodiment, the input and output holes 32, 22 (see FIG. 3) are omitted respectively from the input and output bodies 31, 21. In addition, the torque beam unit 4 is cross-shaped, and includes a shaft 41, two first beams 42 extending radially and outwardly from the shaft 41 in opposite directions and aligned with each other, two second beams 43 extending radially and outwardly from the shaft 41 in opposite directions and aligned with each other, two first bolts 44 each extending through the output body 21 and threaded to a respective one of the first beams 42, and two second bolts 45 each extending through the input body 31 and threaded to a respective one of the second beams 43.

Figure 7:
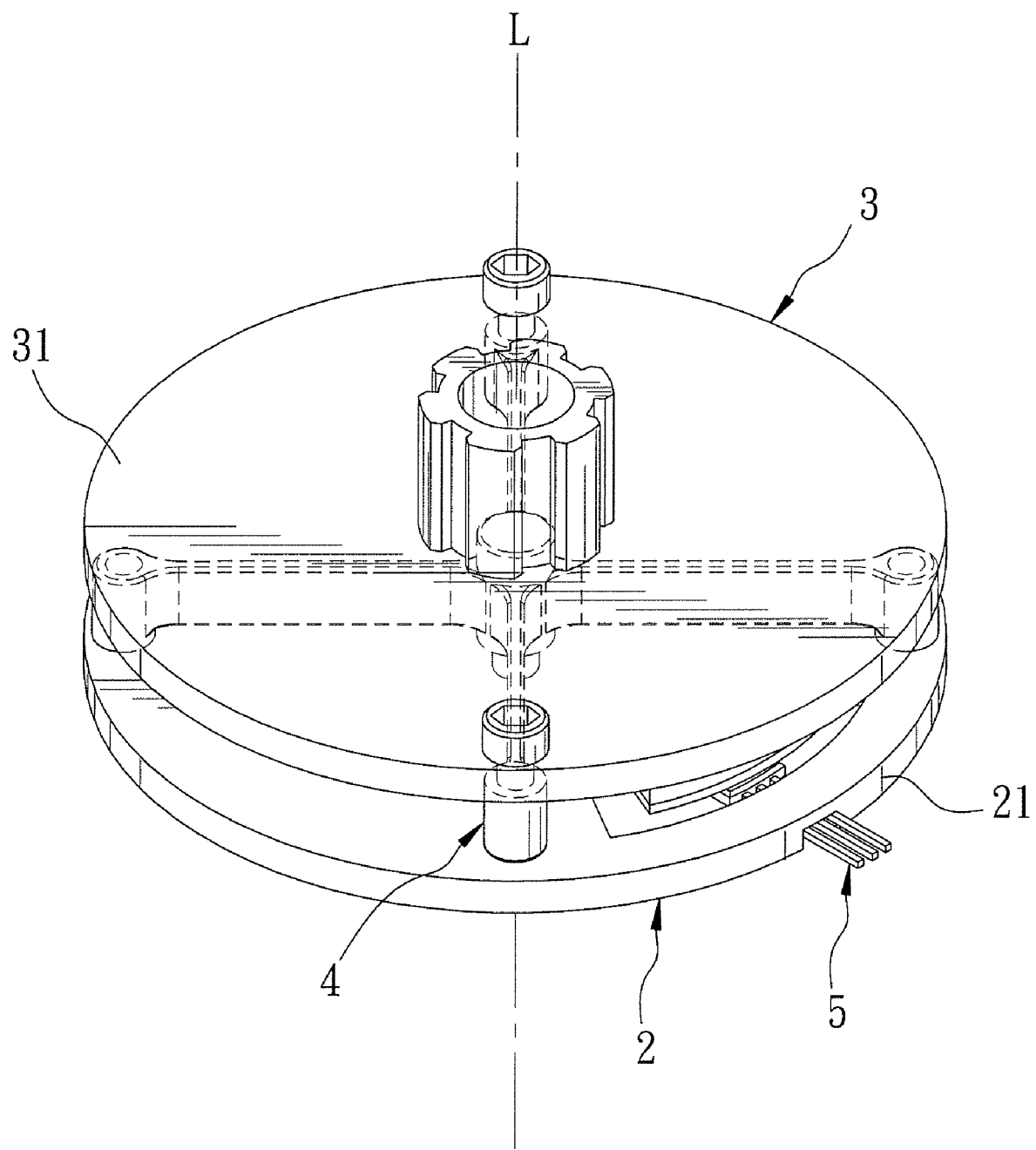
FIG. 7 is an assembled perspective view of the third preferred embodiment of a torque detector according to this invention.
Figure 8:
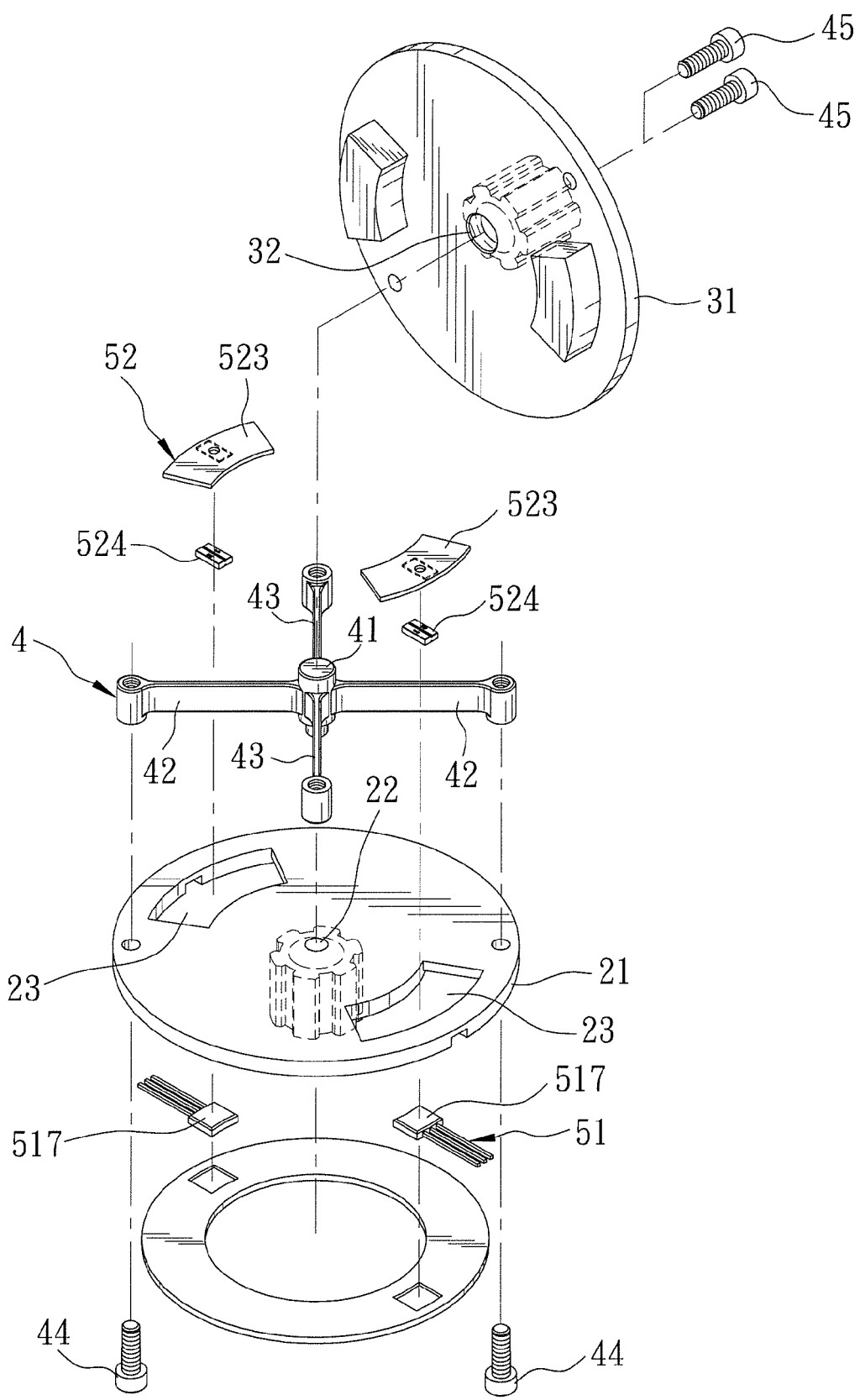
FIG. 8 is an exploded perspective view of the third preferred embodiment.
Figure 9:
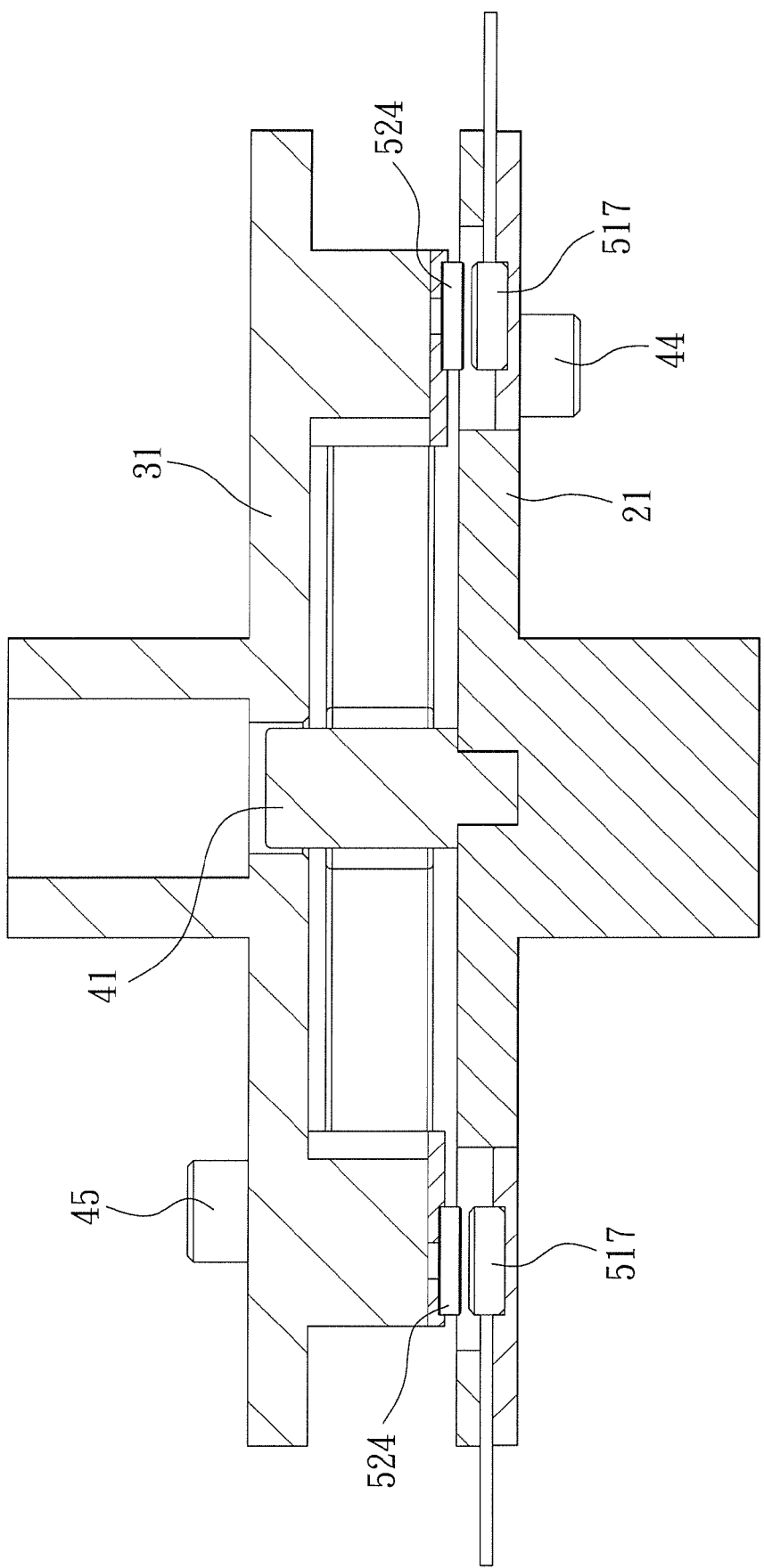
FIG. 9 is a sectional view of the third preferred embodiment.

FIGS. 7, 8, and 9 show the third preferred embodiment of a torque detector according to this invention, which is similar in construction to the first preferred embodiment, except for the torque beam unit 4 and the detecting unit 5. In this embodiment, the torque beam unit 4 is cross-shaped, and includes a shaft 41 having two opposite ends extending respectively into the input and output holes 32, 22, two first beams 42 extending radially and outwardly from the shaft 41 in opposite directions and aligned with each other, two second beams 43 extending radially and outwardly from the shaft 41 in opposite directions and aligned with each other, two first bolts 44 each extending through the output body 21 and threaded to a respective one of the first beams 42, and two second bolts 45 each extending through the input body 31 and threaded to a respective one of the second beams 43.

In this embodiment, the first detecting member 51 includes two magnetic flux sensors 517. The second detecting member 52 includes two magnets 524 disposed respectively within the through grooves 23 in the output body 21, and two second mounting members 523 each disposed between the input body 31 and the corresponding magnet 524 for connecting the corresponding magnet 524 fixedly to the input body 31.

Upon application of a torque to the input body 21 to deform the torque beam unit 4, the magnets 524 co-rotate with the input body 21. At this time, each of the magnetic flux sensors 517 senses a change of a magnetic flux developed from the corresponding magnet 524 to thereby generate an electric signal corresponding to the angular displacement of the input body 21.

With this invention thus explained, it is apparent that numerous modifications and variations can be made without departing from the scope and spirit of this invention. It is therefore intended that this invention be limited only as indicated by the appended claims.

We claim:

1. A torque detector comprising:
   an output unit including an output body;
   an input unit including an input body adapted to permit a torque to be applied thereto;
   a torque beam unit including
      a shaft,
      at least one flexible first beam extending radially and outwardly from said shaft and having a proximate end portion connected to said shaft, and a distal end portion connected to and co-rotatable with said output body, and
      at least one second flexible beam extending radially and outwardly from said shaft in a direction different from that of said first beam and having a proximate end portion connected to said shaft, and a distal end portion and co-rotatable with said input body; and
   a detecting unit disposed between said input and output units for converting a relative rotation of said input and output bodies into an electric signal.

2. The torque detector as claimed in claim 1, wherein said detecting unit includes a first detecting member disposed on one of said input and output bodies, and a second detecting member disposed on the other one of said input and output bodies for converting a relative rotational displacement of said first and second detecting members into an electric signal.

3. The torque detector as claimed in claim 2, wherein said second detecting member includes at least one conductor, and said first detecting member includes at least one resistor member in electrical contact with said conductor, and at least one conductive member spaced apart from said resistor member and in electrical contact with said conductor.

4. The torque detector as claimed in claim 3, wherein said first detecting member further includes a first mounting member permitting said resistor member and said conductive member to be disposed thereon, and said second detecting member further includes at least one second mounting member connected between said input body and said conductor, said resistor member including a pair of first and second contact pins interconnected in series, said conductive member including an output contact pin for outputting the electric signal.

5. The torque detector as claimed in claim 1, wherein said torque beam unit further includes at least one first bolt extending through said output body and threaded to said first beam, and at least one second bolt extending through said input body and threaded to said second beam.

6. The torque detector as claimed in claim 1, wherein:
said output unit further includes an output hole formed in said output body;
said input unit further includes an input hole formed in said input body; and
said shaft of said torque beam unit has two opposite ends extending respectively into said output hole in said output body and said input hole in said input body.

7. The torque detector as claimed in claim 1, wherein said first and second beams are aligned with each other.

8. The torque detector as claimed in claim 1, wherein said torque beam unit includes two said flexible first beams extending radially and outwardly from said shaft in different directions, and two said second flexible beams extending radially and outwardly from said shaft in different directions.

9. The torque detector as claimed in claim 8, wherein said first beams are aligned with each other, and said second beams are aligned with each other.

* * * * *